United States Patent
Ghafourifar et al.

(10) Patent No.: US 10,110,585 B2
(45) Date of Patent: Oct. 23, 2018

(54) MULTI-PARTY AUTHENTICATION IN A ZERO-TRUST DISTRIBUTED SYSTEM

(71) Applicant: Entefy Inc., Palo Alto, CA (US)

(72) Inventors: Alston Ghafourifar, Los Altos Hills, CA (US); Joseph Kye Monroe, Santa Clara, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

(21) Appl. No.: 15/396,474

(22) Filed: Dec. 31, 2016

(65) Prior Publication Data

US 2018/0191697 A1    Jul. 5, 2018

(51) Int. Cl.
*H04L 29/06*    (2006.01)
*H04L 29/08*    (2006.01)

(52) U.S. Cl.
CPC .............. *H04L 63/08* (2013.01); *H04L 63/10* (2013.01); *H04L 65/403* (2013.01); *H04L 67/10* (2013.01); *H04L 2209/46* (2013.01)

(58) Field of Classification Search
CPC ......... H04L 63/08; H04L 63/10; H04L 65/40; H04L 65/403; H04L 67/10; H04L 2209/46
See application file for complete search history.

(56) References Cited

U.S. PATENT DOCUMENTS

| | | | |
|---|---|---|---|
| 9,219,724 B1 * | 12/2015 | Choudhary | H04L 63/08 |
| 9,231,955 B1 * | 1/2016 | Mehresh | H04L 63/104 |
| 9,602,508 B1 * | 3/2017 | Mahaffey | H04L 63/0869 |
| 9,699,170 B2 * | 7/2017 | Sondhi | H04L 63/0815 |
| 2006/0291448 A1 * | 12/2006 | Hellgren | H04L 63/08 370/352 |
| 2012/0324237 A1 * | 12/2012 | D'Souza | H04L 9/0894 713/189 |
| 2014/0331282 A1 * | 11/2014 | Tkachev | H04L 63/08 726/3 |
| 2015/0119000 A1 * | 4/2015 | Miao | H04W 12/06 455/411 |
| 2015/0288578 A1 * | 10/2015 | Schwengler | G06Q 20/3821 705/39 |
| 2017/0039388 A1 * | 2/2017 | Vas | G06F 21/6245 |

* cited by examiner

*Primary Examiner* — Hadi S Armouche
*Assistant Examiner* — Alexander R Lapian
(74) *Attorney, Agent, or Firm* — Blank Rome LLP

(57) ABSTRACT

A zero-trust network and methods of using same are disclosed. The network includes a plurality of nodes, some of which are user devices, such as mobile phones, some of which are computer servers. One or more of the nodes includes a directory system. When a server receives an access request by a user device or other node, the directory system is notified of the request. The directory system will contact a number of randomly selected nodes, and if any one of the nodes does not recognize the requesting device, the requesting device will be denied access. If every queried node is able to authenticate the requesting device, the directory system creates a session for the first device to access the server. The directory system can grant access by providing the server and device reciprocating keys. After the session ends, the accessed node is assigned a new identifier.

26 Claims, 4 Drawing Sheets

MULTI-PARTY AUTHENTICATION IN A ZERO-TRUST DISTRIBUTED SYSTEM

TECHNICAL FIELD

This disclosure relates generally to computer network security. More specifically, this disclosure relates to systems, methods, and computer readable media for multi-party authentication for access permissions in a distributed system without a central trusted authority.

BACKGROUND

The vast majority of software-based systems rely heavily on the assumption that a server and any client application are designed to interact with a "trusted" resource and therefore, the information and directives which are sent to and from the server are assumed to be "trusted" by the client. In some systems, this could constitute all aspects of the product, whereas in other more secure systems that facilitate end-to-end encryption schemes or possess limited client-server communication, the trusted authority is expected to reliably connect one peer to another for an anonymous key exchange, thus maintaining the privacy of data shared between each peer. In both cases, the central, otherwise trusted authority is still vulnerable to compromise and therefore, the assumption of a "trusted" resource, while traditionally necessary, is an inherent point of vulnerability when designing for system integrity. Further, compromise can occur by exploiting such vulnerabilities via external and internal penetration. Internal compromise is exceptionally difficult to protect against because, it requires that a system or set of processes does not trust itself, a system admin, server, or other authorizing party. This could be made to be analogous to the challenges with a body detecting and fighting cancer since the primary difficult results in detection and containment of one's own cells. In a server system, these internal parties can, through malice, compromise, or negligence, violate the integrity of the trusted server, having likely been put in a position to be a trusted resource within an otherwise secure network.

The subject matter of the present disclosure is directed at overcoming, or at least reducing, the effects of one or more of the problems set forth above.

BRIEF DESCRIPTION OF THE DRAWINGS

In order to describe the manner in which the features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered limiting of its scope, the principles herein are described and explained with additional specificity and detail through the use of the accompanying drawings in which.

DETAILED DESCRIPTION

Figure 1:
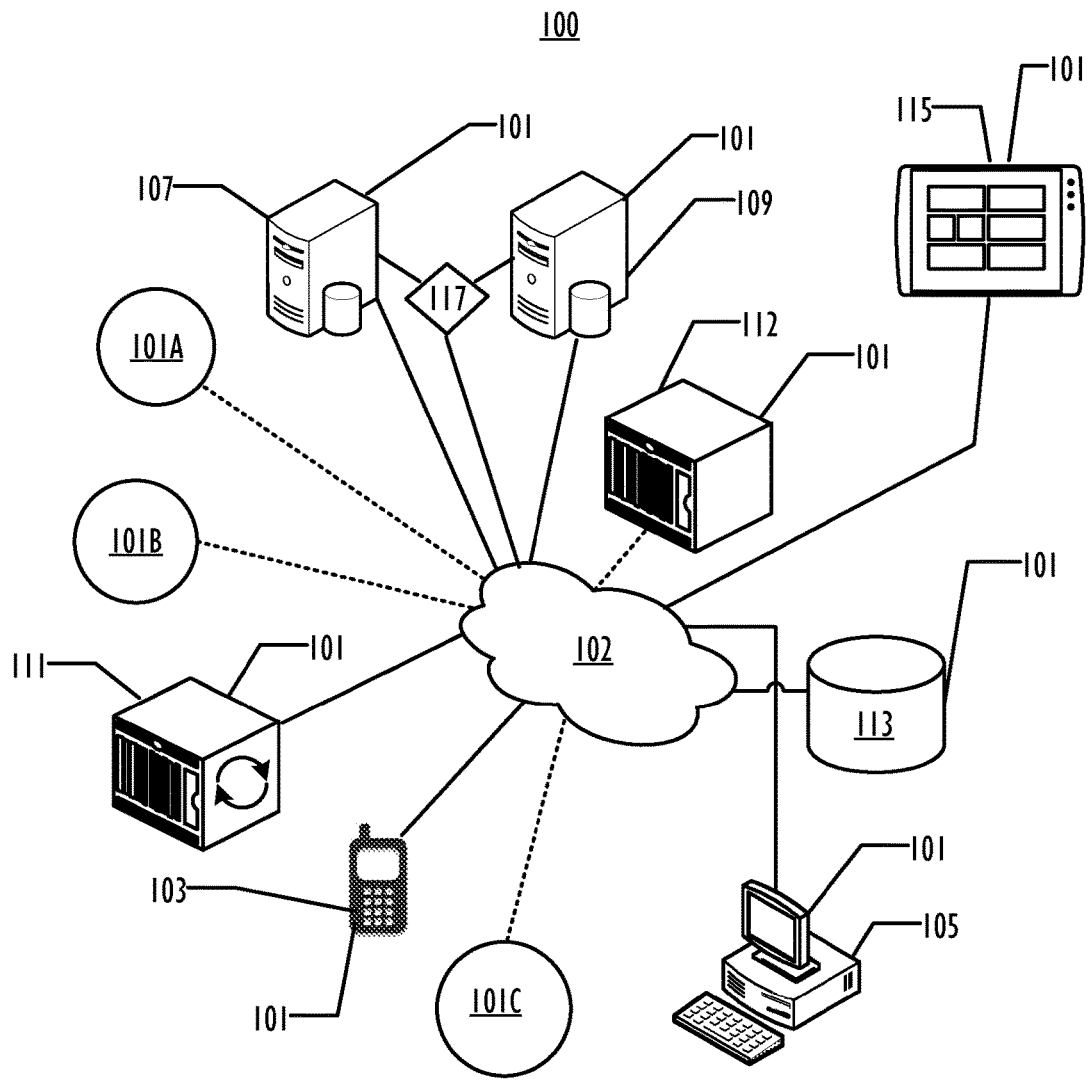
FIG. 1 is a block diagram illustrating a zero-trust network system, in accordance with one or more disclosed embodiments.

Various embodiments of the disclosure are discussed in detail below. While specific implementations are discussed, it should be understood that this is done for illustration purposes only. A person skilled in the relevant art will recognize that other components and configurations may be used without parting from the scope of the disclosure.

Several definitions that apply throughout this document will now be presented. The phrase 'coupled' is herein defined as connected, whether directly or indirectly through intervening components and is not necessarily limited to physical connections. Coupled devices are devices which are in signal communication with one another. The term 'node' includes any electronic device that is capable of at least accepting data, transmitting data, and executing commands and is coupled to one or more other such device and/or network, mesh, and the like. For example, nodes can include, but are not limited to, portable communication devices, mobile communication devices, mobile computers, smartphones, computing pads, tablet computers, personal computers, desktop computers, laptop computers, netbooks, servers, host devices, routers, and other computing devices capable of at least accepting data, transmitting data, and/or executing commands. The term 'server' refers to computer programs or devices that provide functionality for other programs or devices. The term 'user device' refers to nodes that include a human interface through which data can be input, such as mobile phones, desktop computers and the like. Within this disclosure, the term 'agent' includes, but is not limited to, a user (and the associated user device), node, server, client, or store. In summary, a user device and a server are each a node, a node and a user (via an approved user device) are each an agent. Such agents will normally play an active role in a tokenization/authentication process, as will be explained below.

For the purposes of this disclosure, 'data' can include text entry, selection of manual inputs (such as keys on a keyboard), audio information, visual information and biometric information generally, (for example, voice recognition, retinal scanning, and/or fingerprint reader). The term 'directory system' refers to a specific node, also an agent, with the responsibility of storing at least a central listing of unique identifiers and permission access levels for all known nodes throughout the system in order to ensure that all active agents are known and authorized in the system. The directory system is responsible for sharing identifiers of known users and entities with every individual node. As a consequence, all nodes effectively "know" all the other nodes; that knowledge coming from the directory system. The directory system can be responsible for issuing encryption keys (optimally the public key associated with each node) and/or other tokens. The term 'monitor system,' or simply 'monitor,' refers to a server with a dedicated purpose, which is to monitor the other nodes of the system, including the directory system(s). The monitor ensures that the directory system does not make any data push, or update the central directory, without its prior knowledge. This ensures that compromise to the central directory cannot be used to directly compromise other nodes in the system. The monitor is primarily a monitoring agent that can be controlled by another machine and/or authorized person(s). Generally speaking, if the directory system(s) behave(s) out of sync with the monitor, that behavior can be flagged and/or stopped by the monitor, either notifying an authorized user agent or preventing the directory system from performing its current action entirely. The monitor can be configured to randomly select nodes as necessary, and to generate random numbers/identifiers for use by the zero-trust system.

As noted above, the vast majority of software-based systems are configured and used with the assumption that they contain at least one "trusted" resource. That is, conventional systems often rely on a single point of authentication, a "trusted" central server or other similar mechanism, as a way to admit a client or other actor into the network in a "trusted" manner. However, if the single trusted component becomes compromised, other sub-systems within the main system can become compromised. Embodiments of this disclosure are directed toward a system in which, rather than having a single central authority be the sole conservator of device identities, all nodes know the identities of all other nodes and are instructed to mutually authorize and unauthorize one another; resulting in a more secure system which is harder to compromise internally or externally.

Aspects of this disclosure pertain to a key creation and validation system which requires multiple parties (a/k/a "agents") randomly selected by the directory system under the supervision of the monitor, with simultaneous connectivity to mutually authenticate and validate each participating endpoint, (a/k/a "node"), so as to practically eliminate the opportunity for single-point-of-failure compromises, such as identity spoofing. The systems and methods described herein greatly reduce the likelihood of system compromise.

In at least one embodiment of this disclosure, all (or most) nodes of a network system, that is, every user, service, or server in the system is provided a constantly-updated list of identifiers for each other node in the system. Nodes which are identified as compromised do not receive such updates. According to this disclosure, a user or system requesting access to a specific node (such as a server) must initiate a request with a directory system containing a central director, and be co-authenticated by at least one other user and at least one other system. These authenticating nodes can be chosen at random by both the central directory and the user (device) initiating the request.

An embodiment of this disclosure is a zero-trust network system which includes a plurality of nodes including a plurality of user devices, a plurality of servers, one or more directory systems, and one or more monitor systems. A first directory system of the embodiment is configured to receive, from a first node, a first request for access to a second node. The first directory system will upon receipt of the first request send validation requests to at least three randomly selected nodes. It will deny the first node access to the second node if the first directory system does not receive a validation message from each of the randomly selected nodes within a predetermined time. However, a monitor system can prevent the directory system from sending the validation requests in the event the first monitor system determines that it did not log an event necessitating the validation requests. In other words, if the monitor system cannot confirm that the validation requests should be sent, it will prevent the directory system from sending them. The randomly selected nodes can include at least one user device which requires receipt of authenticating information via a physical interface (i.e., coming from a person), and at least two servers. In an embodiment, the first directory system can also confirm that the at least three randomly selected nodes are currently connected in a live shared session until the predetermined time has elapsed.

According to at least one embodiment, the first directory system can also be configured to cause the selected nodes to cease validating the first node if one or more of them becomes disconnected from the first directory system, disconnected from one or more of the other randomly selected nodes, or both, during the authentication process. If the directory system makes provision for a single session, in which a first node accesses a second node, the monitoring system can monitor the single session. Monitoring can include ensuring that the session complies with rules associated with a key or token which enabled the session. The rules will include the requirement that the session end after a set time or other specified conditions. Additionally, the monitoring system can notify the directory system when the session ends, and the directory system will thereafter cause the second node to change the second node's identifier, update the information in the central directory, and notify all remaining nodes of the new identifier. If the identity of the node requesting access is not validated, that node can be quarantined by the directory system and other protective measures can be taken.

FIG. 1 illustrates a zero-trust network system 100 according to an embodiment of this disclosure. A plurality of nodes 101 are communicatively coupled to one another through sub-network 102. In FIG. 1, all nodes 101 are coupled to all other nodes. This fact is depicted, for clarity, as all nodes 101 being connected to sub-network 102. Sub-network 102 can include many different types of computer networks, such as, but not limited to, the World Wide Web, the Internet, a corporate network, an enterprise network, or a Local Area Network (LAN). Each of these networks can contain wired or wireless devices and operate using any number of network protocols (e.g., TCP/IP). Sub-network 102 may be connected to various gateways and routers, connecting various machines to one another, represented, e.g., by mobile phone 103, personal computer 105, servers 107 and 109, and directory systems 111 and 112, data base 113, and monitor 115, as well as any number of additional nodes 101, e.g., 101A, 101B, and 101C. The nodes which are connected to sub-network 102 (a/k/a "hub") by solid lines will, in most embodiments, be present, (though, for example, mobile phone 103 and personal computer 105 represent any type of suitable user device). The nodes 101 that are connected to the hub 102 by dashed lines may vary in number, e.g., there will most likely be many more nodes 101, such as 101A-101C, and secondary directory system 112 may or may not be present, depending on whether it has been instantiated.

In FIG. 1, the plurality of nodes 101 includes multiple user devices 103, 105, such as first user device 103, mobile phone 103 and second user device 105, personal computer 105. The system 100 also includes a plurality of nodes 101 which are servers, e.g., first server 107 and second server 109. The system 100 also includes one or more directory systems, e.g., first directory system 111. First directory system 111 can store a central directory 216 containing information about all other nodes 101 of the system 100 (see FIG. 2). In one example operation of system 100, a first node 101 such as the first user device 103, or the first server 107 can request access to a second node 101, such as the second server 109. The request for access will be routed to the directory system 111 by a routing unit 117, which can comprise a protocol redirect, a firewall, a switch, or other similar means understood by those of skill in the art. One routing unit 117 is illustrated, but generally speaking can exist between any of the nodes 101, and can be considered as residing within hub 102. As will be described in greater detail below, the directory system 111 is configured to receive such a request for access.

When the first directory system 111 receives the request for access to the second node 101, the first directory system 111 engages at least one user device 105 and at least two automated nodes 101A-B. This can include sending validation requests to at least three randomly selected nodes 101 from amongst the plurality of remaining nodes 101, (i.e. excluding the first server 107, second server 109, and the first user device 103). The nodes 101 that receive validation requests will then each—independently of one another—determine whether the first node 101 (user device 103) is authentic. This can be done by requesting the node 101 (e.g., 103, 107) which is seeking access, to provide an identifier (e.g., a unique ID) that was previously pushed to the requesting node 101 by directory system 111 based on the central directory 216 stored therein, (see FIG. 2). In various embodiments, the identifiers assigned to a given device are frequently changed, and the other nodes 101 are provided a list of current identifiers assigned to other nodes 101. If the requesting device 103, 107 does not provide an identifier that matches the identifier stored in the authenticating node, the queried node 101 will not find the requesting device to be authentic. If a node 101 queried by the first directory system 111 is unable to determine the authenticity, the node 101 can notify the first directory system 111 and/or other nodes 101 of this fact. Such notifications are monitored and logged by the monitor 115. In at least one embodiment, part of a node's 101 determination can include a request for human user input. In other words, one of the nodes to which a validation request can require that a person confirms his or knowledge of the identity of the node 101 seeking access.

Continuing with the discussion of FIG. 1, the first directory system 111 will deny the first node 101, for example, access to the second node 101 (e.g., server 109) if the first directory system 111 does not receive a validation message from all of the randomly selected nodes 101 to which the first directory system 111 sent a validation request, within a predetermined time. The amount of allotted time can be set by an administrator or preprogrammed into the first directory system 111. At least one benefit of the mode of operation described above is that there is no single device/node 101 that can validate a node 101 attempting to penetrate the system 100. Rather, every node 101 is initially treated as being untrusted when it seeks access to another node, cluster, etc. Moreover, it should be evident to those of skill in the art that although a single node 101 might be spoofed, the multi-layered authentication process means that penetration of the system 100 is very unlikely.

Additional protections can also be implemented. For example, to further decrease the likelihood that a cyber-attack on the system 100 might be successful, the randomly selected nodes 101 described in the preceding paragraph can themselves be selected from a subset of available nodes 101 which is randomly populated at random intervals. In at least one embodiment of the system 100, the second server 109 can be set up to deny access if the second server 109 receives a request for access, such as from first user device 103, but the message requesting access does not comply with a predetermined protocol. Furthermore, one or more of the nodes 101 queried by the first directory can be configured to instantiate a second directory system 112. The second directory system 112 can monitor the authentication process and/or initiate validation requests to other nodes 101, or perform other security functions.

In at least one embodiment, the first directory system 111 can quarantine the first user device 103 if the first directory system 111 does not receive a verification notice from all nodes 101 queried, the first directory system 111 and/or monitor 115, can quarantine the first user device 103 if the first user device 103 did not notify the first directory system 111 that the first user device 103 requested permission to access the second server 109.

As stated above, if the first directory system 111 does not receive a validation message from all of the nodes 101 that the first directory requested to authenticate the first user device 103, the first directory system 111 will deny the first user device 103 access. On the other hand, if the first directory system 111 receives verification from all requested nodes 101, the first directory system 111 is configured to enable the first user device 103 to access the second server 109. Enabling the first user device 103 to access the second server 109 can be done by various means. For example, the first directory system 111 can send a token to the first user device 103 which, upon acceptance of the token by the second server 109, will allow the first user device 103 to access the second server 109. Rather than granting permanent access, access can be granted for a single session that lasts no longer than a predetermined amount of time. After the session ends—for whatever reason—including expiration of the time allotted for the session or the user of the first device leaves the session, it will be impossible to recreate the session; and the token will be useless or destroyed, such as by overwriting the location storing the token with zeros. Another way that the first directory system 111 can enable the first user device 103 to access the second server 109 is by providing a first key to the first user device 103 and a second key to the second server 109. If, for example, the first user device 103 sends a message encrypted with the first key to the second server 109, the server can decrypt the message using the second key, and a session can begin. Other means of enabling access will be evident to those of skill in the art. As before, once the session ends—even if caused simply by a bad connection—the keys become useless because they are configured as such, or they are simply destroyed/erased/written over. Regardless, the session, once ended, cannot be recreated. As an extra failsafe, the monitor 115 can validate access by the first node and monitor the enabled session. When the monitor 115 determines that the session has terminated, the monitor 115 can notify the directory system 111, and the accessed second node can have a new identifier assigned by the directory system 111 which is stored in the central directory 216 and pushed to all nodes 101 of the system. The monitor 115 can ensure compliance with session rules, such may be included in a session token pushed to first requesting node 101 or the second 'target' node 101.

Turning to user devices 103, 105 of the zero-trust network system 100, a user device, for example, the first user device 103, can require that it receive proper authentication inputs prior to sending an access request, such as by entry of a user name and password physically entered into the first user device 103, and/or other data/information such as audio information, visual information and biometric information. The first user device 103 can also be configured to receive additional authentication information, such as user name and password of a second user directly entered into the first user device 103, or received from another node 101, such as second user device 105 or second server 109.

Figure 2:
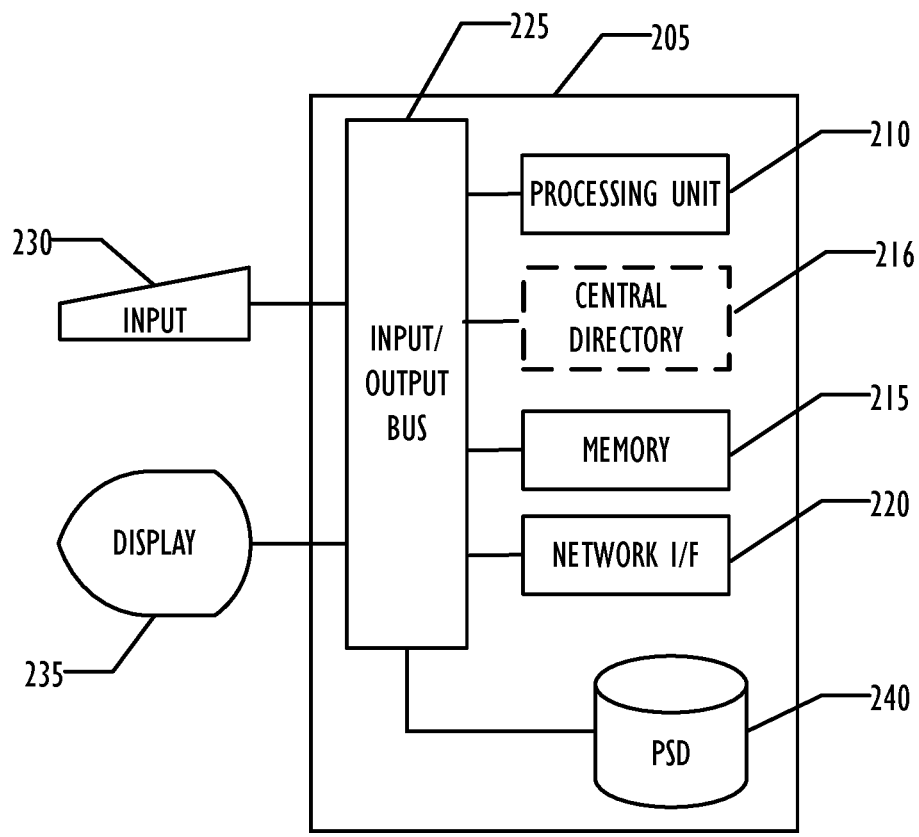
FIG. 2 is a block diagram illustrating a computing device which could be used to implement embodiments of this disclosure.

Referring now to FIG. 2, an example processing device 200 for use in the communication systems described herein according to one embodiment is illustrated in block diagram form. Processing device 200 may serve in most types of nodes 101 discussed with regard to FIG. 1, e.g., a mobile phone 103, end user computer 105, a directory system 111, or a server computer 107, 109. Example processing device 200 comprises a system unit 205 which may be optionally connected to an input device 230 (e.g., keyboard, mouse, touch screen, etc.) and display 235. A program storage device 240 (sometimes referred to as a hard disk, flash memory, or non-transitory computer readable medium) can be included within the system unit 205. A directory system, such as first directory system 111, also includes a central directory 216, which contains information about all nodes 101 of the system 100, including identifiers for all nodes 101. Also included with system unit 205 may be a network interface 220 for communication via a network, including, but not limited to hub 102 and other networks (either cellular or computer) with other mobile and/or embedded devices (not shown). Network interface 220 may be included within system unit 205 or be external to system unit 205. In either case, system unit 205 (101) will be communicatively coupled to network interface 220, which will couple to hub 102. As noted each node 101 can be coupled to each other node 101 via hub 102. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 and central directory 216 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company.) Memory 215 may include one or more memory modules and comprise random access memory (RAM), read only memory (ROM), programmable read only memory (PROM), programmable read-write memory, and solid-state memory.

Figure 3:
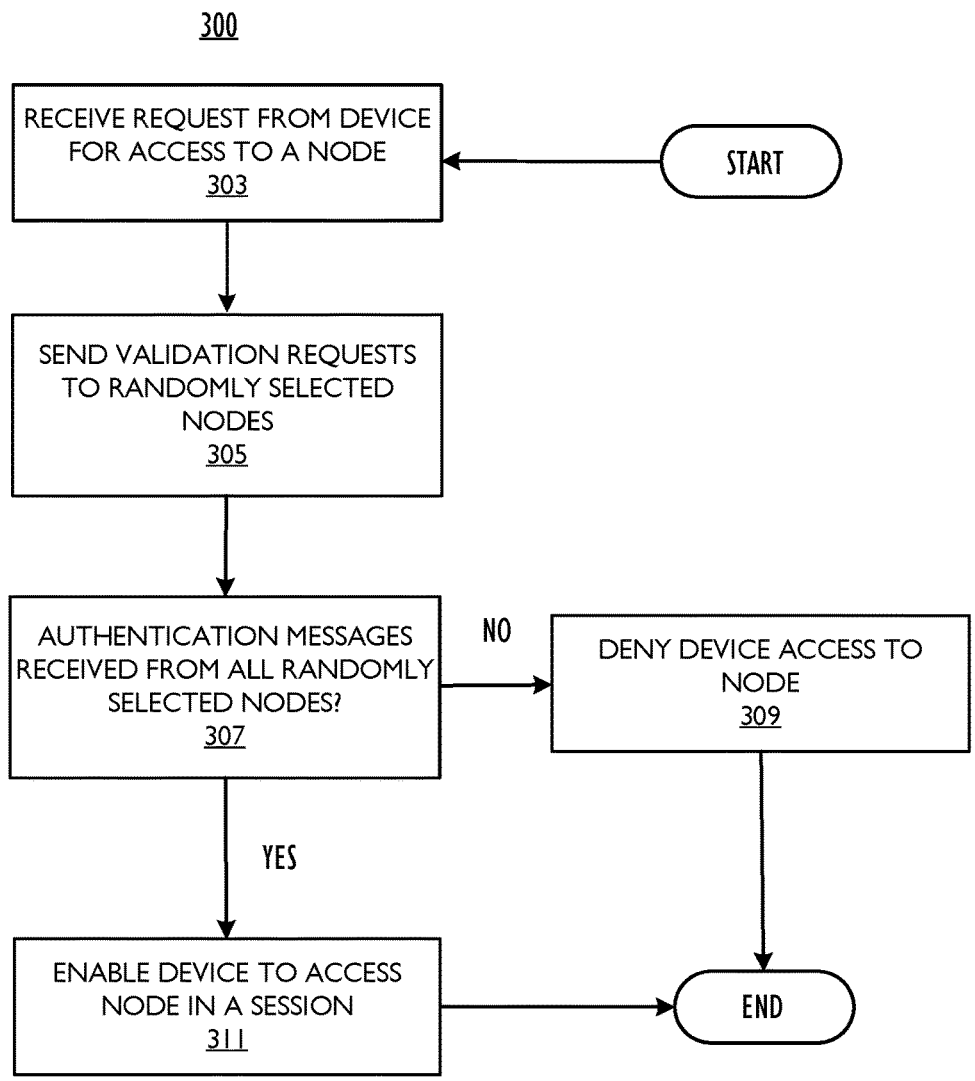
FIG. 3 illustrates a method of managing a zero-trust network system, in accordance with one or more disclosed embodiments.

FIG. 3 illustrates a method 300 of managing a zero-trust network system 100, in accordance with an embodiment of this disclosure. The method 300 starts when a first directory system, receives 303 a request from a first node 101 (e.g., 103) to allow the first node to access a second node, such as second server 109. In response to the request for access, the first directory system 115 will send 305 validation requests to at least three randomly selected nodes 101. If the first directory system 111 does not receive 307 a validation message from each and every one of the randomly selected nodes 101 queried within a predetermined time, the first directory system 111, denies 309 the first node 101 (user device 103, server 107) access to the second node 101 (second server 109). The method can end after step 319. Alternatively, other measures can be taken by the system 100 to protect the system 100 from penetration by the requesting node 101. Conversely, if the first directory system 111 receives indications from all of the nodes 101 queried that the first node 101 is valid, the first directory system 111 can enable 311 the first node 101 to access the second node (second server 109) in a session as described above. The method 300 can then end, or other steps can be taken. For example, the monitor 115 can monitor the session which the first directory system 111 has enabled, as described above.

Figure 4:
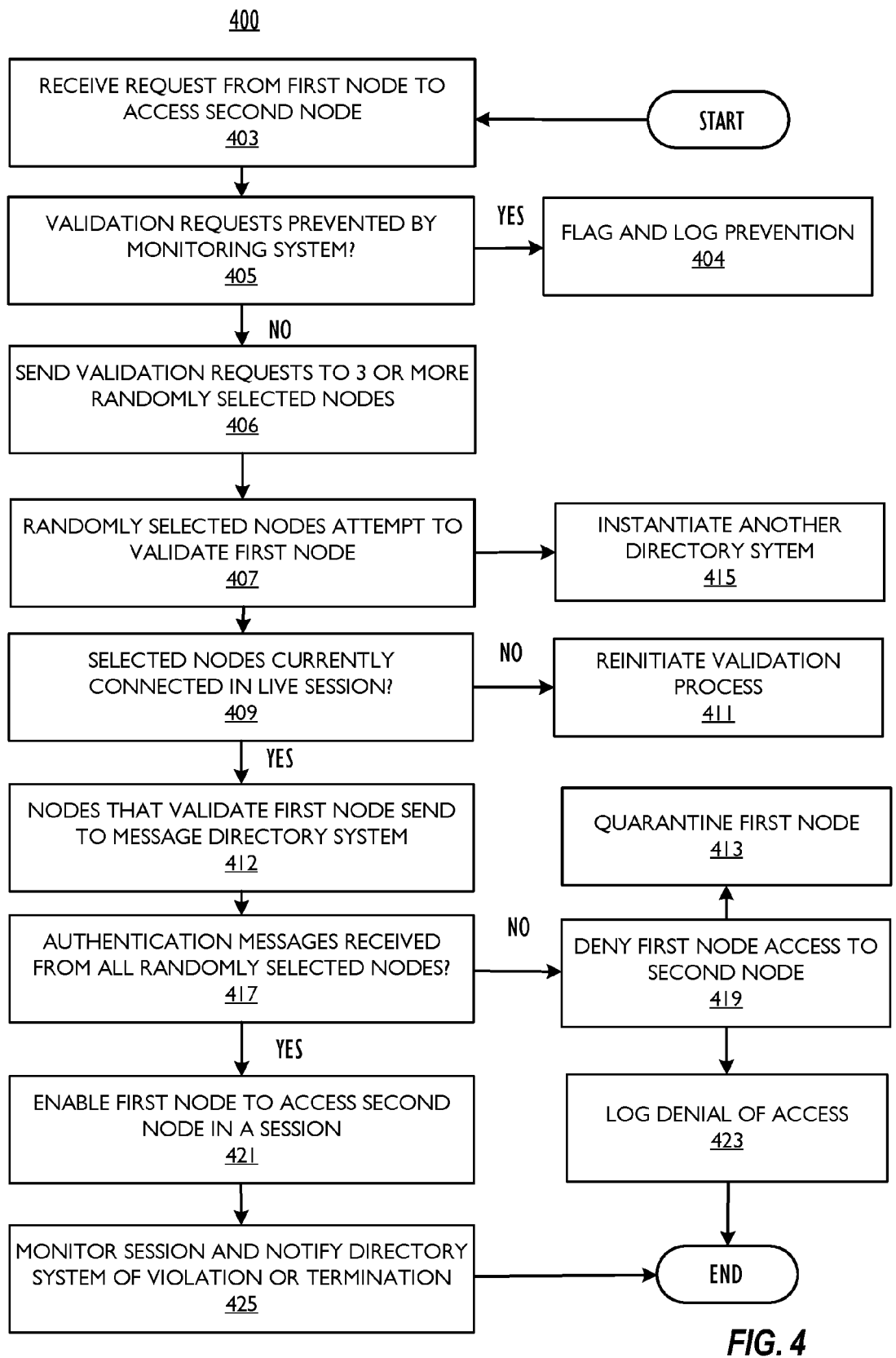
FIG. 4 illustrates a method of managing a zero-trust network system, in accordance with an embodiment of this disclosure.

FIG. 4 illustrates a method 400 of managing a zero-trust network system 100, in accordance with an embodiment of this disclosure. The method 400 begins when a first directory system 111 receives 403 a request from a first node 101 to access a second node 101. At step 405, the method 400 determines whether the first monitoring system 115 has prevented first directory system 111 from sending validation requests. If so, the monitoring system 115 will flag and log the improper validation procedure, (such as when the monitoring system has no record of an event precipitating a need for a validation). Otherwise first directory system 111 then sends 406 validation requests to at least three randomly selected nodes 101 from amongst the plurality of remaining nodes 101, (the first node and the second node do not get to validate the first node). The randomly selected nodes then attempt to validate 407 the first node. During the validation process, each of the randomly selected nodes 101 will also attempt to verify the other randomly selected nodes. Additionally, one or more of the requested nodes 101 can instantiate 415 another directory system 112. During validation 407 by the selected nodes 101, the first directory system 111 can monitor and confirm 409 that they are currently connected in a live, shared, session. If a connection is lost, the validation process can be reinitiated 411. Those nodes 101 which can authenticate the first node 101, as well as the other authenticating node, will message 412 the directory system 111 of that fact. If the directory system 111 does not receive 417 messages from all the selected nodes 101 indicating the first node 101 is valid, the first node 101 will be denied 419 access. The denial 419 can be logged 423 by the monitory system 115 and the first node 101 can be quarantined 413, and the method 400 can end. If, however, all requested nodes 101 validate the first node 101, (and correspondingly send 412 validation messages to the directory system 111), access to the second node 101 will be granted 421. During the granted session, the monitoring system 115 can monitor 425 the session and ensure that the session complies with rules associated with the session token(s) sent to enable the session. The monitoring system 115 can notify 425 the directory system 111 when the session ends. The method 400 can end, or the directory system 111 can cause the second node 101 to change the second node's identifier and update the information in the central directory 216 correspondingly. Thereafter, the directory system 111 can and notifying all remaining nodes 101 of the new identifier of the second node.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

Examples of embodiments of this disclosure are listed below:

1. A zero-trust network system, comprising: a plurality of nodes, the plurality of nodes including: a plurality of user devices, the plurality of user devices comprising a first user device; a plurality of servers, the plurality of servers comprising a first server and a second server; and one or more authority systems, the one or more authority systems including a first authority system, wherein the first server is configured to receive, from the first device, a first request for access to the first server; the first server is further configured to notify the first authority system of the first request when the first server recognizes the first user device; the first server is further configured to deny the first request when the first server does not recognize the first user device, and to notify the first authority system of the denial; and the first authority system is configured to, upon receipt of the notification of the first request from the first server, send validation requests to at least two randomly selected nodes from amongst the plurality of remaining nodes, and further configured to deny the first user device access to the first server in event that the first authority system does not receive a validation message from each of the randomly selected nodes within a predetermined time.

2. The zero-trust network system of example 1, wherein the at least two randomly selected nodes are selected from a subset of available nodes, the subset of available nodes randomly populated at random intervals.

3. The zero-trust network system of example 1, wherein the first server is further configured to deny access to the first server when the received first request does not comply with a predetermined protocol.

4. The zero-trust network system of example 3, wherein the first server is further configured, upon such denial of access, to notify one or more nodes from amongst the plurality of nodes of the denial, including the first authorization system.

5. The zero-trust network system of example 1, wherein at least one of the randomly selected nodes is configured to instantiate a second authority system, upon receipt of receipt of a validation request from the first authority system.

6. The zero-trust network system of example 1, wherein each of the randomly selected nodes is configured to determine the authenticity of the first user device, responsive to receipt of a validation request sent to the node by the first authority system, and configured to send a validation message to the first authority system upon such determination.

7. The zero-trust network system of example 1, wherein the first authority system is further configured to deny the first user device access to the first server in event the first authority system does not receive a corresponding notification from the first user device of the request to access the first server.

8. The zero-trust network system of example 1, wherein the first authority system is further configured to quarantine the first user device in event that the first authority system does not receive a verification notice from each of the randomly selected nodes within the predetermined time, in event the first authority system does not receive a corresponding notification from the first user device of the request to access the first server, or both.

9. The zero-trust network system of example 1, wherein the first authority system is further configured to enable the first user device to access the first server in event the first authority system receives a validation message from each of the randomly selected nodes within a predetermined time.

10. The zero-trust network system of example 9, wherein enabling the first user device to access the first server comprises providing a token to the first user device which, upon acceptance of the token by the first server, allows the first user device to access the first server during a single session that lasts no longer than a predetermined amount of time, the single session being impossible to recreate.

11. The zero-trust network system of example 9, wherein enabling the first user device to access the first server comprises providing a first key to the first user device and a second key to the first server, and wherein the first server is further configured, upon decryption by one of the keys of a message encrypted using the other, to allow the first user device to access the first server during a single session, the single session lasting no longer than a predetermined amount of time, and being impossible to recreate.

12. The zero-trust network system of example 1, wherein the first user device is configured to send the first request for access to the first server and notify the first authority system of the request, upon receipt by the first user device of proper authentication information, the proper authentication information comprising a first authenticating input and one or more additional authenticating inputs.

13. The zero-trust network system of example 11, wherein at least one of the one or more additional authenticating inputs is received from a second user device from amongst the plurality of user devices.

14. A method of managing a zero-trust network system, the method comprising: receiving at a first server, a first request for access to the first server, from the first user device; notifying, by the first server, a first authority system of the first request when the first server recognizes the first user device; denying, by the first server, the first request when the first server does not recognize the first user device; notifying, by the first server, the first authority system of the denial; sending, by first authority system, validation requests to at least two randomly selected nodes from amongst the plurality of remaining nodes, upon receipt of the notification of the first request from the first server; and denying, by first authority system, the first user device access to the first server in event the first authority system does not receive a validation message from each of the randomly selected nodes within a predetermined time.

15. The method of managing a zero-trust network system of example 14, wherein the at least two randomly selected nodes are selected from a subset of available nodes, the subset of available nodes randomly populated at random intervals.

16. The method of managing a zero-trust network system of example 14, further comprising: denying, by the first server, access to the first server when the received first request does not comply with a predetermined protocol.

17. The method of managing a zero-trust network system of example 16, further comprising: notifying, by the first server, one or more nodes from amongst the plurality of nodes of the denial, including the first authorization system, upon such denial of access.

18. The method of managing a zero-trust network system of example 14, further comprising: instantiating, by at least one of the randomly selected nodes, a second authority system, upon receipt by the randomly selected nodes of a validation request from the first authority system.

19. The method of managing a zero-trust network system of example 14, further comprising: determining, by each of the randomly selected nodes, the authenticity of the first user device, responsive to receipt of a validation request sent by the first authority system; and sending, by each of the randomly selected nodes, a validation message to the first authority system upon such determination.

20. The method of managing a zero-trust network system of example 14, further comprising: denying, by the first authority system, the first user device access to the first server in event the first authority system does not receive a corresponding notification from the first user device of the request to access the first server.

21. The method of managing a zero-trust network system of example 14, further comprising: quarantining, by the first authority system, the first user device in event that the first authority system does not receive a verification notice from each of the randomly selected nodes within the predetermined time, in event the first authority system does not receive a corresponding notification from the first user device of the request to access the first server, or both.

22. The method of managing a zero-trust network system of example 14, further comprising: enabling, by the first authority system, the first user device to access the first server in event the first authority system receives a validation message from each of the randomly selected nodes within a predetermined time.

23. The method of managing a zero-trust network system of example 22, wherein enabling the first user device to access the first server comprises providing a token to the first user device which, upon acceptance of the token by the first server, allows the first user device to access the first server during a single session that lasts no longer than a predetermined amount of time, the single session being impossible to recreate.

24. The method of managing a zero-trust network system of example 22, wherein enabling the first user device to access the first server comprises providing a first key to the first user device and a second key to the first server, and wherein the first server is further configured, upon decryption by one of the keys of a message encrypted using the other, to allow the first user device to access the first server during a single session, the single session lasting no longer than a predetermined amount of time, and being impossible to recreate.

25. The method of managing a zero-trust network system of example 14, further comprising: sending, by the first user device, the first request for access to the first server and notifying, by the first user device, the first authority system of the request, upon receipt by the first user device of proper authentication information, the proper authentication information comprising a first authenticating input and one or more additional authenticating inputs.

26. The method of managing a zero-trust network system of example 25, wherein at least one of the one or more additional authenticating inputs is received from a second user device from amongst the plurality of user devices.

27. A zero-trust networking environment, comprising: a plurality of nodes, the plurality of nodes including: a plurality of user devices, the plurality of user devices comprising a first user device; a plurality of servers, the plurality of servers comprising a first server and a second server; one or more authority systems, the one or more authority systems including a first authority system; and at least one memory coupled to at least some of the plurality of nodes, including the first server, the second server, and the first authority system, the at least one memory storing computer readable instructions, the instructions comprising instructions to: receive, at the first server, a first request for access to the first server, from the first user device; notify, by the first server, the first authority system of the first request when the first server recognizes the first user device; deny, by the first server, the first request when the first server does not recognize the first user device; notify, by the first server, the first authority system of the denial; send, by first authority system, validation requests to at least two randomly selected nodes from amongst the plurality of remaining nodes, upon receipt of the notification of the first request from the first server; and deny, by the first authority system, the first user device access to the first server in event the first authority system does not receive a validation message from each of the randomly selected nodes within a predetermined time.

28. The zero-trust networking environment of example 27, wherein the at least two randomly selected nodes are selected from a subset of available nodes, the subset of available nodes randomly populated at random intervals.

29. The zero-trust networking environment of example 27, wherein the instructions further comprise instructions to: deny, by the first server, access to the first server when the received first request does not comply with a predetermined protocol.

30. The zero-trust networking environment of example 29, wherein the instructions further comprise instructions to: notify, by the first server, one or more nodes from amongst the plurality of nodes of the denial, including the first authorization system, upon such denial of access.

31. The zero-trust networking environment of example 27, wherein the instructions further comprise instructions to: instantiate, by at least one of the randomly selected nodes, a second authority system upon receipt by the randomly selected node of a validation request from the first authority system.

32. The zero-trust networking environment of example 31, wherein the instructions further comprise instructions to: determine, by each of the randomly selected nodes, the authenticity of the first user device, responsive to receipt of a validation request sent by the first authority system; and send, by each of the randomly selected nodes, a validation message to the first authority system upon such determination.

33. The zero-trust networking environment of example 27, wherein the instructions further comprise instructions to: deny, by the first authority system, the first user device access to the first server in event the first authority system does not receive a corresponding notification from the first user device of the request to access the first server.

34. The zero-trust networking environment of example 33, wherein the instructions further comprise instructions to: quarantine, by the first authority system, the first user device in event that the first authority system does not receive a verification notice from each of the randomly selected nodes within the predetermined time, in event the first authority system does not receive a corresponding notification from the first user device of the request to access the first server, or both.

35. The zero-trust networking environment of example 27, wherein the instructions further comprise instructions to: enable, by the first authority system, the first user device to access the first server in event the first authority system receives a validation message from each of the randomly selected nodes within a predetermined time.

36. The zero-trust networking environment of example 35, wherein enabling the first user device to access the first server comprises providing a token to the first user device which, upon acceptance of the token by the first server, allows the first user device to access the first server during a single session that lasts no longer than a predetermined amount of time, the single session being impossible to recreate.

37. The zero-trust networking environment of example 35, wherein enabling the first user device to access the first server comprises providing a first key to the first user device and a second key to the first server, and wherein the first server is further configured, upon decryption by one of the keys of a message encrypted using the other, to allow the first user device to access the first server during a single session, the single session lasting no longer than a predetermined amount of time, and being impossible to recreate.

38. The zero-trust networking environment of example 27, wherein the instructions further comprise instructions to: send, by the first user device, the first request for access to the first server and notifying, by the first user device, the first authority system of the request, upon receipt by the first user device of proper authentication information, the proper authentication information comprising a first authenticating input and one or more additional authenticating inputs.

39. The zero-trust networking environment of example 38, wherein at least one of the one or more additional authenticating inputs is received from a second user device from amongst the plurality of user devices.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms such as "including" and "in which" are used as plain-English equivalents of the respective terms "comprising" and "wherein."

The invention claimed is:

1. A zero-trust network system, comprising:
a plurality of nodes, the plurality of nodes including:
a plurality of user devices;
a plurality of servers;
one or more directory servers, the one or more directory servers including a first directory server; and
one or more monitor servers, the one or more monitor servers comprising a first monitor server,
wherein the first directory server is configured to receive, from a first node, a first request for access to a second node,
wherein the first directory server is further configured to, upon receipt of the first request from the first node, send validation requests to at least three randomly selected nodes from amongst a plurality of remaining nodes of the plurality of nodes unless prevented from doing so by the first monitor server based on a determination that no event necessitating the validation requests was previously logged,
wherein each of the at least three randomly selected nodes is configured to determine the authenticity of the first node and each other node of the at least three randomly selected nodes, responsive to receipt of a validation request sent to each of the at least three randomly selected nodes by the first directory server,
wherein each of the at least three randomly selected nodes is further configured to send a validation message to the first directory server upon such determination, within a predetermined time, and
wherein the first directory server is further configured to deny the first node access to the second node in an event that the first directory server does not receive a validation message from each of the at least three randomly selected nodes within the predetermined time.

2. The zero-trust network system of claim 1, wherein the at least three randomly selected nodes include at least one user device requiring entry of authenticating information via a physical interface, and at least two servers.

3. The zero-trust network system of claim 1, wherein the first directory server is further configured to confirm that the at least three randomly selected nodes are connected in a live shared session until the predetermined time has elapsed.

4. The zero-trust network system of claim 3, wherein the first directory server is further configured to cause the at least three randomly selected nodes to cease validating the first node in an event one or more of the at least three randomly selected nodes becomes disconnected from the first directory server, disconnected from one or more other nodes of the at least three randomly selected nodes, or both.

5. The zero-trust network system of claim 1, wherein the first monitor server is further configured, upon such denial of access, to log the denial.

6. The zero-trust network system of claim 1, wherein the first directory server is further configured to enable the first node to access the second node in an event the first directory server receives a validation message from each of the at least three randomly selected nodes within the predetermined time.

7. The zero-trust network system of claim 6, wherein the first directory server being configured to enable the first node to access the second node comprises the first directory server being configured to provide a token to the first node which, upon acceptance of the token by the second node, allows the first node to access the second node during a single session that lasts no longer than a second predetermined amount of time, the single session being impossible to recreate.

8. The zero-trust network system of claim 7, wherein the first monitor server is further configured to monitor the single session, wherein the first monitor server being configured to monitor the single session includes the first monitor server being configured to ensure that the single session complies with rules associated with the token, the rules comprising a rule that the single session end after a set time.

9. The zero-trust network system of claim 8, wherein the second node has an identifier, and wherein the first monitor server is further configured to notify the first directory server when single the session ends, wherein the first directory server is further configured to, responsive to such notification, cause the second node to change the second node's identifier, and wherein the first directory server is further configured to update information in a central director and notify the plurality of remaining nodes of the new identifier.

10. The zero-trust network system of claim 1, wherein at least one of the at least three randomly selected nodes is configured to instantiate a second directory server upon receipt of a validation request from the first directory server.

11. The zero-trust network system of claim 1, wherein the first directory server is further configured to quarantine the first node in an event that the first directory server does not receive a verification notice from each of the at least three randomly selected nodes within the predetermined time.

12. A method of managing a zero-trust network system, the method comprising:
   receiving, at a first directory server, a request from a first node to access a second node;
   sending, by first directory server, validation requests to at least three randomly selected nodes from amongst a plurality of remaining nodes, upon receipt of the request from the first node, unless the first directory server is prevented from doing so by a first monitoring server based on a determination that no event necessitating the validation requests was previously logged; and
   denying, by first directory server, the first node access to the second node, in an event the first directory server does not receive a validation message from each of the at least three randomly selected nodes within a predetermined time,
   wherein each of the at least three randomly selected nodes is configured to determine the authenticity of the first node and each other node of the at least three randomly selected nodes responsive to receipt of a validation request sent to each of the at least three randomly selected nodes by the first directory server, and
   wherein each of the at least three randomly selected nodes is configured to send a validation message to the first directory server upon such determination, within the predetermined time.

13. The method of claim 12, wherein the at least three randomly selected nodes include at least one user device requiring entry of authenticating information via a physical interface, and at least two servers.

14. The method of claim 12, further comprising confirming, by the first directory server, that the at least three randomly selected nodes are connected in a live, shared, session until the predetermined time has elapsed.

15. The method of claim 14, further comprising causing, by the first directory server, the at least three randomly selected nodes to cease validating the first node in an event one or more of the at least three randomly selected nodes becomes disconnected from the first directory server, disconnected from one or more other node of the at least three randomly selected nodes, or both.

16. The method of claim 12, further comprising logging, by the first monitoring system, a denial of access.

17. The method of claim 12, further comprising enabling, by the first directory server, the first node to access the second node in an event the first directory server receives a validation message from each of the at least three randomly selected nodes within the predetermined time.

18. The method of claim 17, wherein enabling the first node to access the second node comprises providing a token to the first node which, upon acceptance of the token by the second node, allows the first node to access the second node during a single session that lasts no longer than a second predetermined amount of time, the single session being impossible to recreate.

19. The method of claim 18, further comprising monitoring, by the first monitoring server, the single session, wherein monitoring the single session includes ensuring that the single session complies with rules associated with the token, the rules comprising a rule that the single session end after a set time.

20. The method of claim 19, further comprising notifying, by the first monitoring server, the first directory server when the single session ends, responsive to such notification, causing the second node to change an identifier of the second node, updating, by the first monitoring server, corresponding information in a central directory, and notifying, by the first monitoring server, all remaining nodes of the new identifier.

21. The method of claim 12, further comprising instantiating, by at least one of the at least three randomly selected nodes, a second directory server upon receipt of a validation request from the first directory server.

22. The method of claim 12, further comprising quarantining, by the first directory server, the first node when the first directory server does not receive a verification notice from each of the at least three randomly selected nodes within the predetermined time.

23. A zero-trust networking environment, comprising:
   at least one processor; and
   a plurality of nodes, the plurality of nodes including:
      a plurality of user devices, the plurality of user devices comprising a first user device;
      a plurality of servers, the plurality of servers comprising a first server and a second server;
      one or more directory servers, the one or more directory servers including a first directory server;
      one or more monitor servers, the one or more monitor servers comprising a first monitor server;
      at least one memory coupled to at least some of the plurality of nodes, including a first node, a second node, the first directory server, and the first monitor server, the at least one memory storing computer readable instructions executable by the at least one processor, the instructions comprising instructions to:
         receive, at the first directory server a request from a first node to access a second node;
         send, by first directory server, validation requests to at least three randomly selected nodes from amongst a plurality of remaining nodes of the plurality of nodes, upon receipt of the request from the first node, unless the first directory server is prevented from doing so by the first monitor server based on a determination that no event necessitating the validation requests was previously logged; and
         deny, by first directory server, the first node access to the second node in an event the first directory server does not receive a validation message from each of the at least three randomly selected nodes within a predetermined time,
         wherein each of the at least three randomly selected nodes is configured to determine the authenticity of the first node and each other node of the at least three randomly selected nodes, responsive to receipt of a validation request sent to each of the at least three randomly selected nodes by the first directory server, and wherein each of the at least three randomly selected nodes is configured to send a validation message to the first directory server upon such determination, within the predetermined time.

24. The zero-trust networking environment of claim 23, wherein the at least three randomly selected nodes include at least one user device requiring entry of authenticating information via a physical interface, and at least two servers.

25. The zero-trust networking environment of claim 24, wherein the instructions further comprise instructions to confirm, by the first directory server, that the at least three randomly selected nodes are connected in a live, shared, session until the predetermined time has elapsed.

26. The zero-trust networking environment of claim 25, wherein the instructions further comprise instructions to cause, under control of the first directory server, the at least three randomly selected nodes to cease validating the first node in an event one or more of the at least three randomly selected nodes becomes disconnected from the first directory server, disconnected from one or more other nodes of the at least three randomly selected nodes, or both.

\* \* \* \* \*